(12) United States Patent
Poslinski (10) Patent No.: US 8,468,454 B2
(45) Date of Patent: Jun. 18, 2013

(54) METHOD AND SYSTEM FOR DISPLAYING PORTIONS OF RECORDED MEDIA CONTENT INSTANCES

(75) Inventor: Thomas Poslinski, Elma, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2301 days.

(21) Appl. No.: 10/926,823

(22) Filed: Aug. 26, 2004

(65) Prior Publication Data

US 2006/0059526 A1 Mar. 16, 2006

(51) Int. Cl.
*H04N 5/445* (2011.01)
*H04N 7/173* (2011.01)
*G06F 3/00* (2006.01)

(52) U.S. Cl.
USPC .............. 715/719; 715/723; 725/88; 725/100

(58) Field of Classification Search
USPC ................. 715/719, 723; 725/2, 88, 700, 110
See application file for complete search history.

(56) References Cited

U.S. PATENT DOCUMENTS

| | | | |
|---|---|---|---|
| 6,091,886 A | 7/2000 | Abecassis | |
| RE37,000 E | 12/2000 | Shinyagaito et al. | |
| 6,177,931 B1 | 1/2001 | Alexander et al. | |
| 6,259,443 B1 | 7/2001 | Williams, Jr. | |
| 6,407,779 B1 | 6/2002 | Herz | |
| 6,564,005 B1 | 5/2003 | Berstis | |
| 6,670,966 B1 * | 12/2003 | Kusanagi | 715/723 |
| 6,748,596 B2 | 6/2004 | Knudson et al. | |
| 6,763,177 B1 * | 7/2004 | Abe et al. | 386/281 |
| 2001/0020953 A1 * | 9/2001 | Moriwake et al. | 345/723 |
| 2002/0033842 A1 * | 3/2002 | Zetts | 345/719 |
| 2002/0044225 A1 | 4/2002 | Rakib | |
| 2002/0092021 A1 * | 7/2002 | Yap et al. | 725/55 |
| 2002/0094193 A1 * | 7/2002 | Tao et al. | 386/52 |
| 2002/0167541 A1 * | 11/2002 | Ando et al. | 345/723 |
| 2003/0172064 A1 * | 9/2003 | Snapp | 707/5 |
| 2006/0098941 A1 * | 5/2006 | Abe et al. | 386/52 |

* cited by examiner

*Primary Examiner* — Daeho Song (74) *Attorney, Agent, or Firm* — Haverstock & Owens (57) ABSTRACT

A method and system for displaying a number of portions of a number of recorded media content instances during a single viewing session. A number of entries are defined to each correspond to one of the number of portions of the number of recorded media content instances. Each of the entries are included in a play list which is selected for viewing. The portions of the number of recorded media content instances included in the entries in the play list are then displayed during the single viewing session.

35 Claims, 10 Drawing Sheets

PLAY LIST 1 ENTRIES

| Order of Play | DESCRIPTION | LENGTH |
|---|---|---|
| 1 | CLIP 1 (145-1) | 17 min |
| 2 | CLIP 2 (145-2) | 32 min |
| 3 | CLIP 3 (145-3) | 4 min |
| 4 | CLIP 4 (145-4) | 87 min |
| 5 | CLIP 5 (145-5) | 12 min |
| 6 | CLIP 6 (145-6) | 30 min |

ADD   DELETE   EDIT   EXIT

Fig. 4

RECORDED PROGRAM LIST

| Title | Length | Date Recorded |
|---|---|---|
| Seinfeld | 30 min | 7/1/04 |
| Sportscenter | 60 min | 6/28/04 |
| The Simpsons | 30 min | 6/27/04 |
| Seinfeld | 30 min | 6/24/04 |
| Wimbledon | 120 min | 6/23/04 |
| Sienfeld | 30 min | 6/17/04 |

METHOD AND SYSTEM FOR DISPLAYING PORTIONS OF RECORDED MEDIA CONTENT INSTANCES

BACKGROUND

The advent of computers, interactive electronic communication, the Internet, and other advances in the digital realm of consumer electronics have resulted in a great variety of programming, recording, and viewing options for users who view media content such as television programs. In implementing such enhanced programming, the set-top box (STB) has become an important computing device for accessing media content services and the media content within those services. In addition to supporting traditional analog broadcast video functionality, STBs may also support an increasing number of two-way digital services such as video-on-demand and personal video recording.

An STB is typically connected to a cable or satellite, or generally, a subscriber television system, and includes hardware and software necessary to provide the functionality of the subscriber television system at the user's site. The STB typically includes a processor, communication components, and memory and is connected to a television or other display device, such as a personal computer. While many STBs are stand-alone devices that are externally connected to a television, an STB and/or its functionality may be integrated into a television or personal computer or even an audio device such as a programmable radio, as will be appreciated by those of ordinary skill in the art.

STBs are typically capable of providing users with a very large number and variety of media content choices. As the number of available media content choices increases, viewing conflicts arise whereby the user must choose between watching two or more media content instances (e.g. discrete, individual instances of media content such as, for a non-limiting example, a particular television show or "program"), all of which the user may like to view. Further, because of the large number of viewing choices, the user may miss viewing opportunities. Buffering of media content instances in memory or other storage device (e.g. hard disk drive) coupled to the STB has provided some relief from the conflict in viewing choices while providing personal video recording functionality. However, current buffering mechanisms for personal video recording are confusing to the user.

As mentioned, an STB may include a personal video recording (PVR) application that provides for media content recording functionality by enabling the temporary writing to, and if requested, more permanent recording to a storage device. A PVR application is also known as a Digital Video Recording (DVR) application. The PVR application may be integrated into the STB or it may be a stand-alone unit known as a personal video recorder. A typical PVR application allows the user to view the media content in trick play modes. Trick play modes allow the user to watch media content in a non-linear fashion by recording the media content in a temporary memory buffer, often called a live cache buffer, and then replaying the recorded media content in a manner other than a normal, sequential replay. Trick play modes include, but are not limited to, slow motion, fast motion, reverse play, fast forward play, instant replay, jumping, pausing of live broadcast, and scanning.

In a typical PVR application, a progress bar is a graphical tool that is used to illustrate how much media content has been recorded during a particular time window. The length of the progress bar may correspond to the amount of media content that has been recorded in a live cache buffer or in a permanent buffer. However, a number of difficulties arise in operating a STB having a PVR application. For example, it is often difficult for a user to select and view multiple media content instances in a single viewing session.

SUMMARY

In one of many possible embodiments, the present invention provides a method and system for displaying a number of portions of a number of recorded media content instances during a single viewing session. The method includes defining a number of entries such that each of the number of entries corresponds to one of the number of portions of the number of recorded media content instances, including each of the entries in a play list, and selecting the play list from a number of play lists for viewing. The portions of the number of recorded media content instances included in the entries in the play list are then displayed during the single viewing session.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method and system for displaying a number of portions of a number of recorded media content instances during a single viewing session are described herein. A number of entries are defined to each correspond to one of the number of portions of the number of recorded media content instances. Each of the entries are included in a play list which is selected by a user for viewing. The portions of the number of recorded media content instances included in the entries in the play list are then displayed during the single viewing session.

In the following description, for purposes of explanation, numerous specific details are set forth in order to provide a thorough understanding of the present system and method. It will be apparent, however, to one skilled in the art that the present system and method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
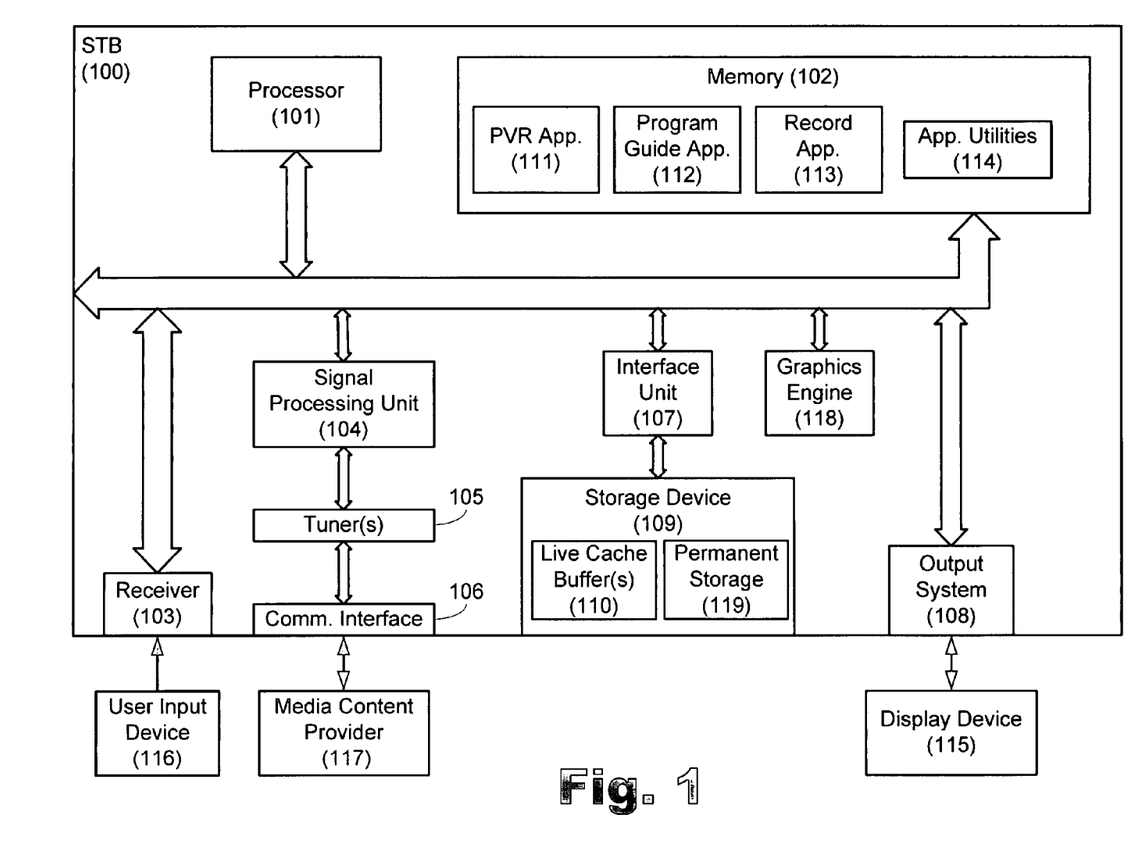
FIG. 1 is a block diagram of an exemplary set-top box (STB) according to one exemplary embodiment of the present invention.

FIG. 1 is a block diagram of an exemplary set-top box (STB) (100) according to an exemplary embodiment of the present invention. An STB (100) may also be referred to as a home communication terminal (HCT) or as a digital home communication terminal (DHCT). As used herein and in the appended claims, unless otherwise specifically denoted, the term "set-top box" will be used to refer expansively to all possible receivers that receive and decode digital and/or analog media content. It will be understood that the STB (100) shown in FIG. 1 is merely illustrative and should not be construed as implying any limitations upon the scope of the preferred embodiments of the invention.

As shown in FIG. 1, the STB (100) may include a communication interface (106) configured to receive media content from a media content provider (117). The media content provider (117) may provide various types of media content via a satellite or cable system (not shown). The media content may include, but is not limited to, television programs, pay-per-view services, video-on-demand programming, Internet services, and audio programming.

The STB (100) may also include a tuner system (105) configured to tune into a particular television channel or frequency to display media content and for sending and receiving various types of data or media content to and from the media content provider (117). According to an exemplary embodiment of the present invention, the tuner system (105) may include multiple tuners such that multiple channels of media content may be processed and/or shown on a display device (115). For example, the tuner system (105) may include a first tuner configured to receive an analog video signal corresponding to a first media content instance and a second tuner configured to simultaneously receive a digital compressed stream corresponding to a second media content instance. The tuner system (105) may have any number of tuners configured to receive any kind of media content according to one embodiment of the present invention.

The STB (100) may also include one or more processors, such as processor (101) configured to control operations of the STB (100), and an output system (108) configured to drive the display device (115). The display device (115) may be a television, computer monitor, or any other device configured to display or play the media content. The STB (100) may also include a signal processing unit (104) configured to process the media content. The signal processing unit (104) may include a demodulating and parsing system (not shown) for demodulating and parsing the media content. In one embodiment, the STB (100) may include multiple signal processing units (104) each corresponding to one of the tuners in the tuner system (105). The STB (100) may also include one or more compression and/or multiplexing units (not shown) for multiplexing various media content streams into a transport stream or the like.

One or more programmed applications (111-113) may be executed by a user of the STB (100) by utilizing the computing resources in the STB (100). The applications, or application clients, may be resident in memory (102). The memory (102) may be FLASH memory, DRAM memory, or a combination of FLASH and DRAM memory, for example. Applications (111-113) stored in memory (102) maybe executed by the processor (101). Data generated by an application may be stored in the memory (102) or in a storage device (109) during the course of application execution. The memory (102) may also include application utilities (114) useful to the applications. The utilities (114) may include a timer manager, a configuration manager, a database manager, and other utilities depending on the particular applications included in the STB (100).

One of the applications may be a program guide application (112) configured to generate a program guide that is displayed on the display device (115). An exemplary program guide is a graphical user interface (GUI) that performs various functions including allowing a user to select and view program information associated with various media content. Another one of the applications may be a record application (113). The record application (113) may be configured to permanently and/or temporarily record media content in one or more buffers or storage units.

The STB (100) may also include a personal video recording (PVR) application (111). According to an exemplary embodiment, the PVR application (111) may be integrated into the STB (100), as shown in FIG. 1, or it may be a stand-alone unit. A stand-alone PVR may be coupled to an STB (100) or it may be used in place of an STB (100). As used herein and in the appended claims, the term "PVR application" will be used to refer to any application or device configured to record media content and/or allow the viewing of media content in trick play mode. Trick play modes include, but are not limited to, slow motion, fast motion, reverse play, fast forward play, instant replay, jumping, pausing of live broadcast, and scanning. In the examples contained herein, it will be assumed that the PVR application (111) is integrated into the STB (100) for illustrative purposes only. In one embodiment, the program guide application (112) and/or the record application (113) may be integrated into the PVR application (111).

The PVR application (111) provides for media content recording functionality by enabling the temporary writing to, and if requested, more permanent recording to a storage device (109). The storage device (109) may be a hard drive, optical disc, or other non-volatile storage unit. The storage device (109) of FIG. 1 is shown to be a part of the STB (100) for illustrative purposes only. It will be understood that the storage device (109) maybe an external storage device.

The STB (100) may also include a graphics engine (118) configured to generate graphics to be displayed on the display device (115). The graphics may include a program guide, a progress bar, and other applications.

In one exemplary embodiment, media content received at the tuner (105) is temporarily buffered, or stored, in a live cache buffer (110). If there are multiple tuners (105), there may be a live cache buffer (110) corresponding to each of the tuners (105). As shown in FIG. 1, the live cache buffer (110) may be a part of the storage device (109) (e.g. a reserved portion of a hard dive). In an alternative embodiment (not shown), the live cache buffer (110) may reside in memory (102) or in a storage device external to the STB (100). Media content received into the live cache buffer (110) has a temporary recording designation. In other words, the media content stored in the live cache buffer (110) will either be deleted or retained through election by the user as a permanent recording. A permanent recording will be understood to mean media content that is stored for an extended period of time as decided by the user. Permanent recordings may be stored in a permanent storage unit (119), for example. The permanent storage unit (119) may be a part of the storage device (109) or it may be a stand-alone unit. For example, the permanent storage unit (119) may be a hard drive, an optical disc, a network drive, a buffer in memory, or any other type of permanent storage device that is a part of the storage unit (109) or that is a stand-alone unit.

Figure 2:
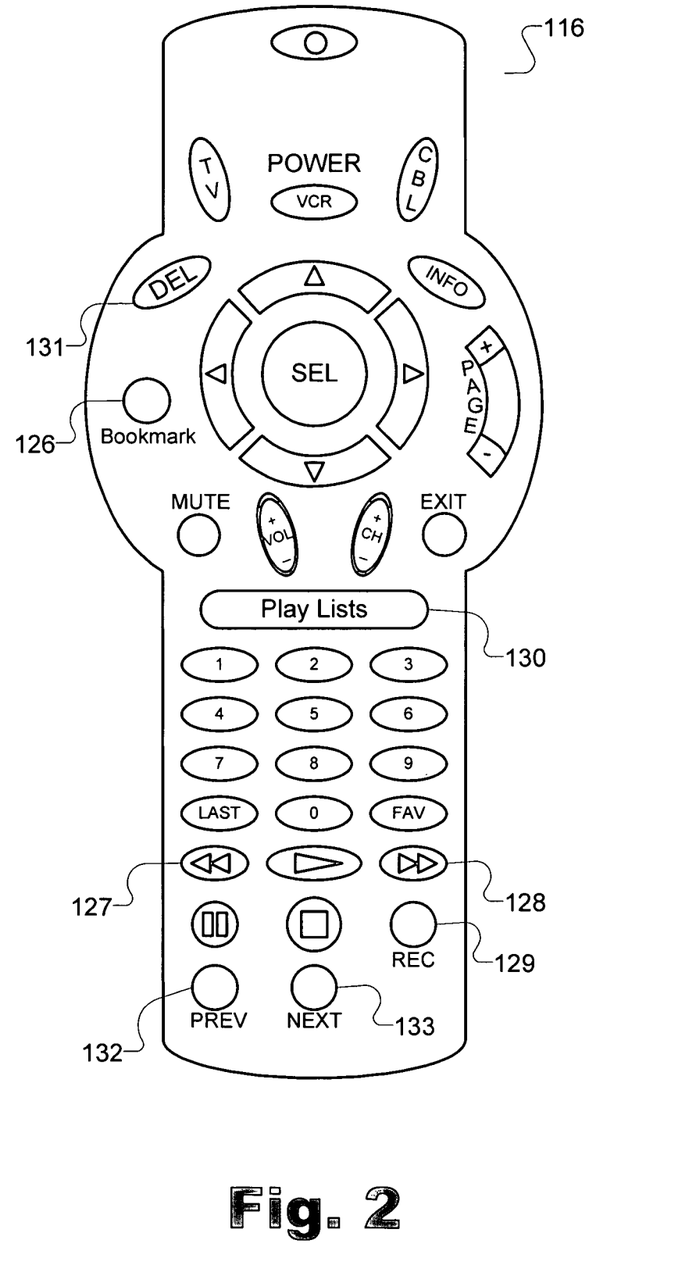
FIG. 2 illustrates an exemplary user input device according to one exemplary embodiment of the present invention.

An exemplary user input device (116) is shown in FIG. 2. The input device (116) may be a remote control, as shown in FIG. 2, or any other type of user input device such as a group of buttons (not shown) affixed to the STB (100), a touch screen input device (not shown) displayed on the display device (115), a keyboard device, or a voice activated device. The input device (116) may be configured to allow a user to control viewing options and trick play modes of the media content. For example, rewind (127) and fast-forward buttons (128) enable a user to access different frames within recorded media content instances in the permanent storage unit (119) or in the live cache buffer (110). A record button (129) may also be included which enables the user to designate as permanently recorded any media content instance buffered in the live cache buffer (110). A play lists button (130) may be configured to evoke the display of a play list graphical user interface (GUI) on the display device (115). A delete button (131) may be configured to delete a currently showing media content instance and/or multiple media content instances. Many alternative methods of providing user input may be used including a remote control device with different buttons and/or button layouts. The embodiments of the invention described herein are not limited by the type of device used to provide user input.

Figure 3:
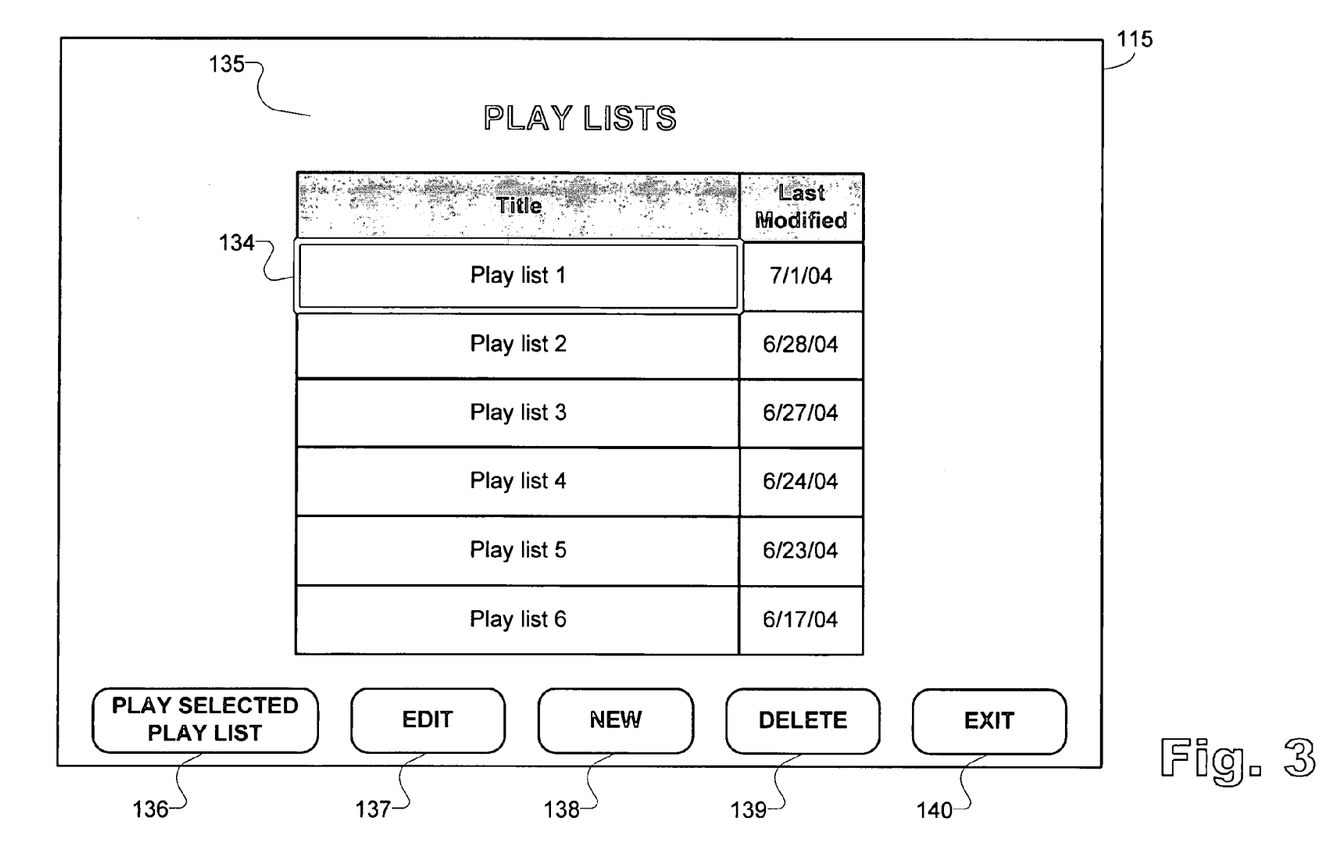
FIG. 3 illustrates an exemplary play lists graphical user interface (GUI) that may be displayed according to one exemplary embodiment of the present invention.

FIG. 3 illustrates an exemplary embodiment of the present invention wherein a play lists graphical user interface (GUI) (135) may be displayed on the display device (115). The display device (115) of FIG. 3 is a television for illustrative purposes. The play lists GUI (135) is configured to assist the user in navigating to, and between, various play lists that have been constructed by the user. The play lists GUI (135) also allows the user to select a particular play list and display the media content contained within the play list on the display device (115). Each play list may include portions of one or more recorded media content instances, as will be explained below. Any reference to recorded or stored media content instances in the following examples and in the appended claims, unless specifically denoted otherwise, refers to media content instances or programs that are permanently stored in a permanent storage unit (119; FIG. 1). Each recorded media content instance has a corresponding media content file according to one embodiment. The media content file comprises media content data representing the media content instance.

In one embodiment, the play lists GUI (135) may display the title of the individual play lists and other information related to the individual play lists such as the date upon which each of the play lists was last modified. Other information such as creation date and program information related to the media content contained within each play list may also be included in the play lists GUI (135). In one embodiment, the display of the play list GUI (135) may be invoked by the user pressing a play lists button (130; FIG. 2) on the user input device (116; FIG. 2) or by some other method, as will be recognized by one skilled in the art.

As shown in FIG. 3, the play lists GUI (135) may include a number of selectable options. For example, the user may choose to play a selected play list (option 136), edit a selected play list (option 137), create a new play list (option 138), delete a selected play list (option 139), or exit the play lists GUI (option 140). For example, if the user chooses to play a selected play list (option 136), the media content contained within the play list is displayed on the display device (115).

In one embodiment, if the user chooses to edit a selected play list (option 137) or create a new play list (option 138), a second GUI configured to allow the user to edit, add, and/or remove entries to the play list may be displayed on the display device (115). Each entry in a play list corresponds to a portion of a particular media content instance.

Figure 4:
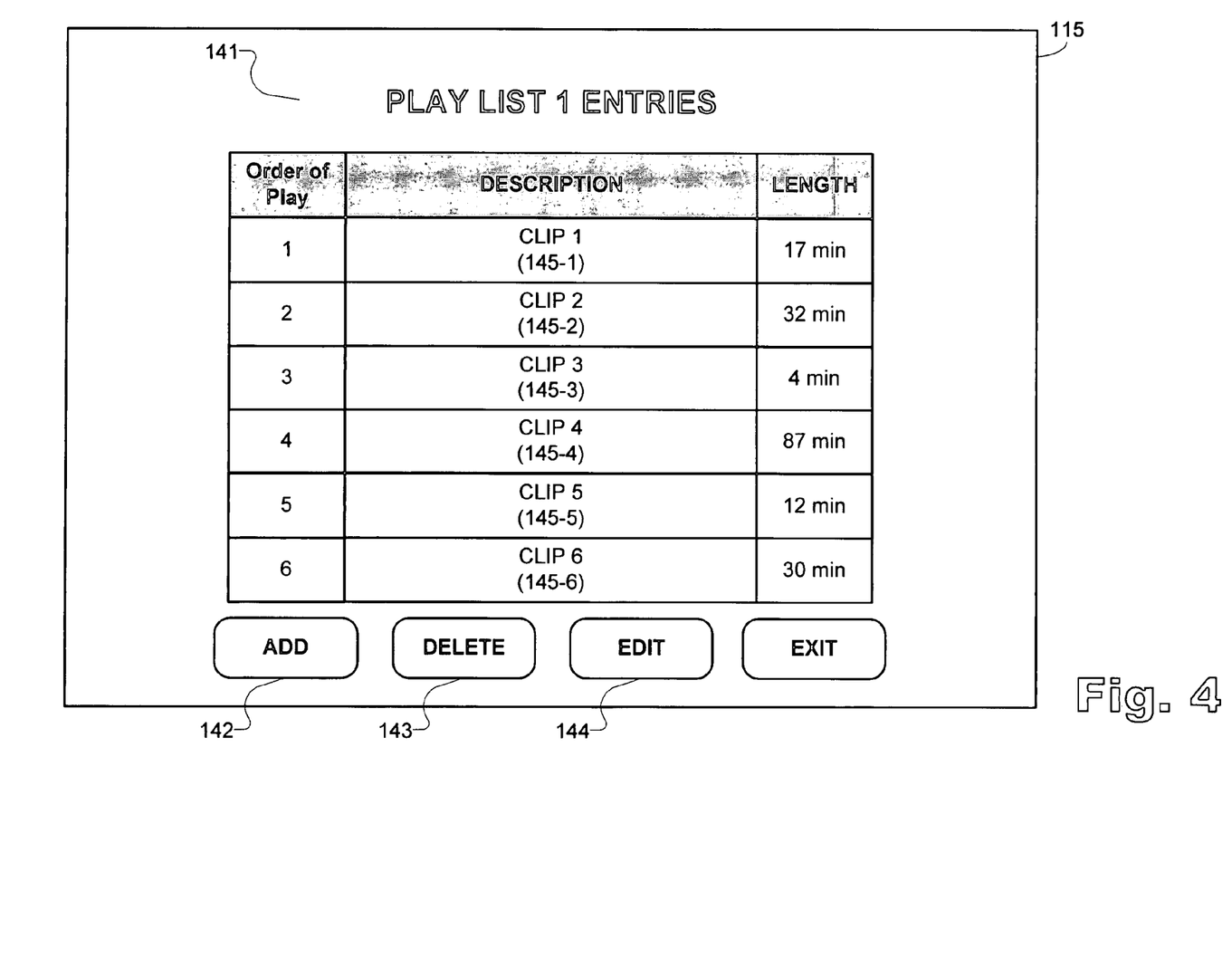
FIG. 4 shows that a second GUI configured to include a list of all the entries included in a play list may be displayed allowing a user to edit the entries in the play list according to one exemplary embodiment of the present invention.

For example, the user may choose to edit the entries in play list 1 (134). Accordingly, as shown in FIG. 4, a second GUI (141) may be displayed on the display device (115). FIG. 4 shows that the second GUI (141) may be configured to include a list of all the entries (145) included in the play list. Each entry (145) may be have a user-definable title (e.g. CLIP 1) and may include information such as the entry's length in minutes. Other information (not shown) corresponding to each of the entries (145) may also be included in the GUI (141).

In one embodiment, the user may specify an order of play for each of the entries (145) in the play list. The order of play refers to the order in which the entries' corresponding media content instances are displayed on the display device (115). The GUI (141) of FIG. 4 shows the order of play for the different entries (145) in the play list. For example, the entry (145-1) is configured to be displayed first on the display device (115) and the entry (145-6) is configured to be displayed sixth on the display device (115).

As mentioned, the GUI (141) of FIG. 4 may include "add" (142), "delete" (143), and "edit" (144) options configured to allow a user to add an entry (145) to the play list, delete an entry (145) from the play list, and/or edit an entry (145) of the play list. Other options may be included as best serves a particular application.

Figure 5:
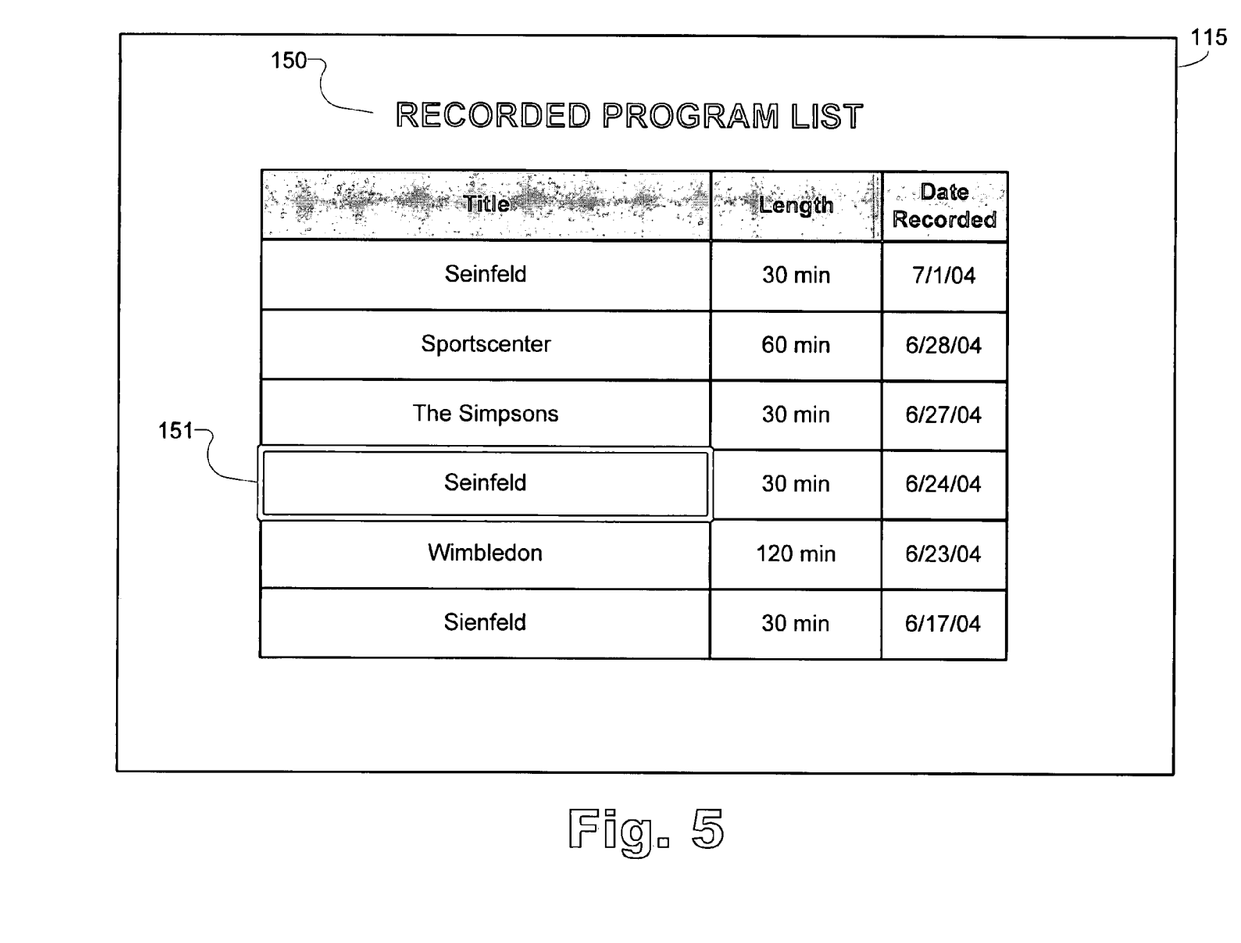
FIG. 5 illustrates a recorded program list GUI according to one exemplary embodiment of the present invention.

FIG. 5 illustrates a recorded program list GUI (150) that may be displayed if the user chooses to add an entry (145) to the play list or to edit an entry (145) already in the play list according to one exemplary embodiment of the present invention. As will be explained below, the user may select a recorded media content instance listed in the recorded program list (150) and then designate begin and end bookmarks within the selected media content instance. The portion of the media content instance located within the designated begin and end bookmarks may then be included in the entry (145) that is added or edited. In one embodiment, each entry (145) may comprise pointers pointing to the beginning and end bookmarks within a media content file corresponding to the selected media content instance.

The recorded program list (150) displays a list of some or all of the media content instances that are permanently stored in the permanent storage unit (119; FIG. 1). For example, as shown in FIG. 5, a number of stored media content instances are listed in the recorded program list (150). The media content instances of FIG. 5 are all television programs for illustrative purposes only. The recorded program list (150) may also include other types of media content such as audio programs and Internet-related material.

As shown in FIG. 5, the recorded program list (150) may be configured to display program information corresponding to each of the recorded media content instances. As shown in FIG. 5, the program information displayed by the recorded program list (150) may include, but is not limited to, the title of the recorded media content instances, the duration of the media content instances, and the date of recording of the media content instances. For example, the recorded program list (150) shows that an episode of Seinfeld (151) was recorded on Jun. 24, 2004 and that its duration was 30 minutes. Program information may also include, but is not limited to, genre information, ratings information, program start and stop times, program descriptions, and other pertinent program information text. According to one exemplary embodiment, the recorded program list (150) may include as much or as little program information as best serves a particular application.

As mentioned, a user may designate a portion of any of the media content instances listed in the recorded program list (150) as an entry (145) in the play list of FIG. 4. For example, a user may designate a portion of the media content instance Seinfeld (151) as an entry (145) in the play list (141) of FIG. 4. In one embodiment, the user first selects a desired media content instance (e.g. Seinfeld (151)). The user may make the selection by highlighting a field in the recorded program list (150) containing the desired media content instance title or by some other known method.

Figure 6:
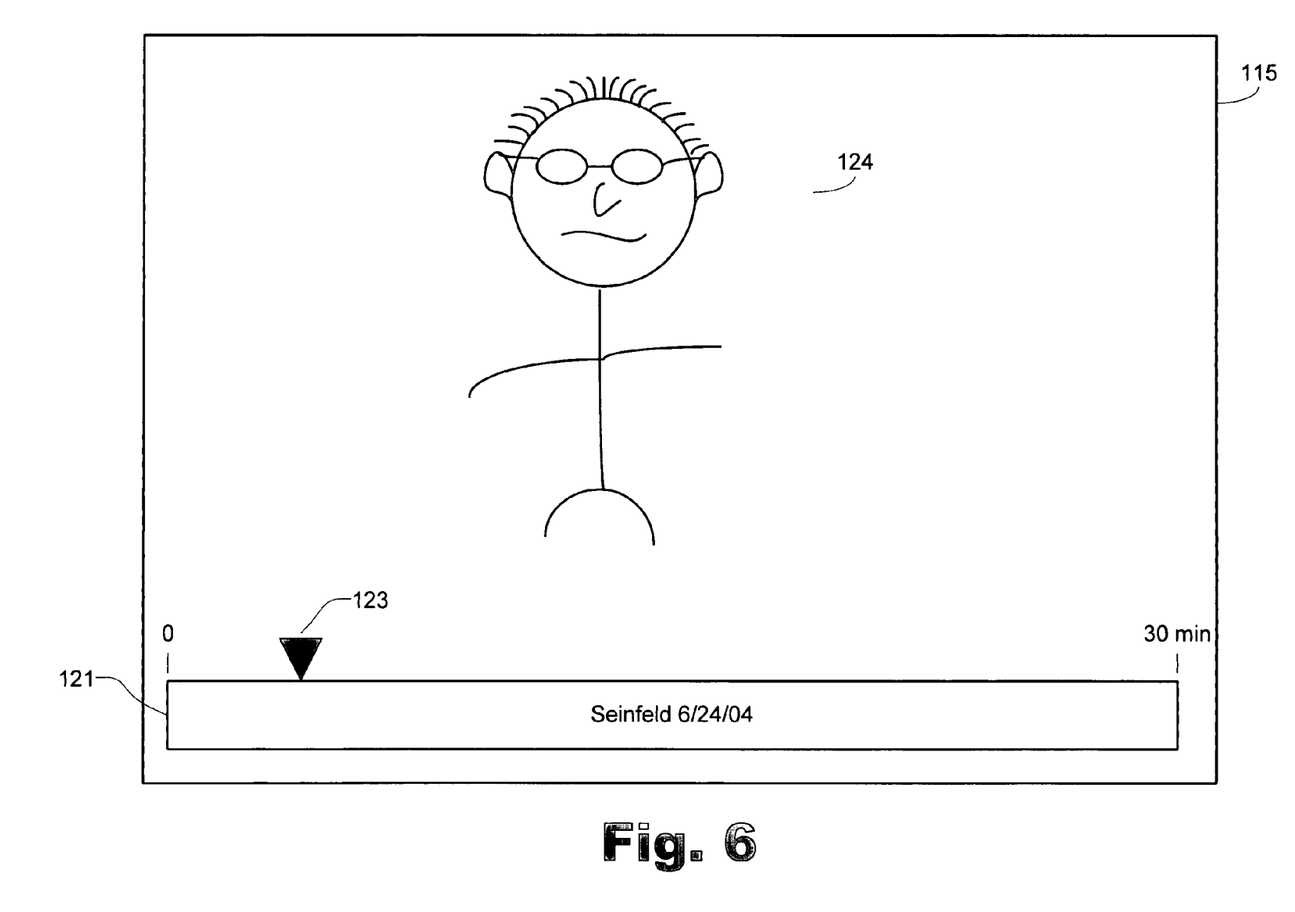
FIG. 6 illustrates an exemplary selected media content instance displayed on a display device according to one exemplary embodiment of the present invention.

Once the user has selected a media content instance, the selected media content instance is displayed or played on the display device (115), as shown in FIG. 6. FIG. 6 illustrates an exemplary embodiment of the present invention wherein a selected media content instance (124) is displayed on a display device (115). The exemplary media content instance (124) of FIG. 6 is the media content instance Seinfeld (151; FIG. 5) for illustrative purposes only.

As shown in FIG. 6, a progress bar (121) may also be displayed on the display device (115) according to an exemplary embodiment. The progress bar (121) is a GUI that assists the user in navigating within the selected media content instance (124). In one embodiment, the progress bar (121) graphically illustrates to a user the total duration of the selected media content instance (124). For example, the progress bar (121) shows that Seinfeld has a duration of 30 minutes. The progress bar may also illustrate a number of other informational facts about the episodes as will be described below. For example, the progress bar (121) may be configured to display the title of the selected media content instance (124) as well as the recording date of the selected media content instance (124), as shown in FIG. 6. Any amount of program information may be displayed with the progress bar (121) according to an exemplary embodiment. For example, the progress bar (121) may be configured to not display any program information.

As shown in FIG. 6, the progress bar (121) may be superimposed on top of the viewing portion of the display device (115) such that the viewer may simultaneously view the media content instance (124) and the progress bar (121). The progress bar (121) is preferably located in the bottom half of the viewing portion of the display device (115), as shown in FIG. 6, so as not to overly interfere with the selected media content instance (124). However, in an alternative embodiment, the progress bar (121) may be located at any position on the viewing portion of the display device (115). Furthermore, the exact location of the progress bar (121) may be specified by the user.

In one embodiment, a progress indicator (123) may also be displayed on the display device (115). The progress indicator (123) graphically indicates to the user the current viewing location within the selected media content instance (124). For example, in FIG. 6, the progress indicator (123) indicates that the currently displayed frame of the media content instance (124) is located towards the beginning of the Seinfeld episode recorded on Jun. 24, 2004.

The progress indicator (123) may be a triangle, as shown in FIG. 6. In an alternative embodiment, the progress indicator (123) may be any shape, such as a vertical line, and may be located above, below, or on top of the progress bar (121). In general, the progress indicator (123) may be any graphical symbol that allows the user to quickly identify the frame that is currently being displayed within the selected media content instance. Furthermore, the user may use the rewind and fast forward buttons (127, 128; FIG. 2) of the user input device (116; FIG. 2) to navigate the progress indicator (123) to any position within the progress bar (121).

Figure 7:
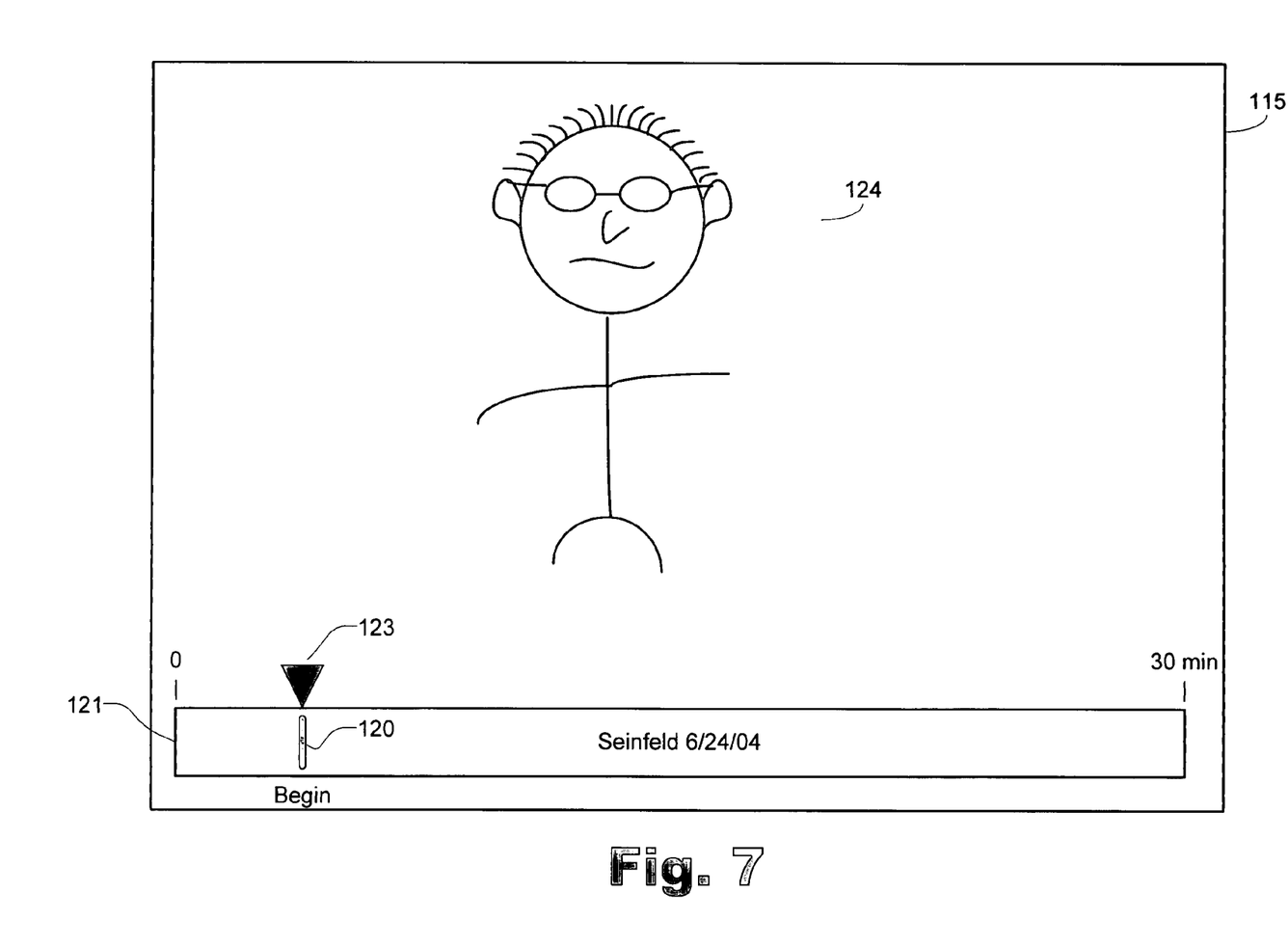
FIG. 7 shows a progress indicator that has been navigated by the user to a location within a progress bar corresponding to a beginning frame of a portion of the media content instance that is to be included as an entry of a play list according to one exemplary embodiment of the present invention.

In one embodiment, the user may use the progress indicator (123) to designate begin and end bookmarks within the selected media content instance (124) corresponding to a portion of the media content instance (124) that is to be included as an entry (145; FIG. 4) of a play list. For example, FIG. 7 shows a progress indicator (123) that has been navigated by the user to a location within the progress bar (121) corresponding to a beginning frame of a portion of the media content instance (124) that is to be included as an entry (145; FIG. 4) of a play list. In one embodiment, the user may designate this frame as the beginning frame of the entry (145) by pressing a "bookmark" button (126; FIG. 2) on the user input device (116; FIG. 2). The frame may alternatively be designated as the beginning frame of the entry (145) by any other method as will be recognized by one of skill in the art. As shown in FIG. 7, a graphical bookmark (120) may be rendered on the display device (115) at a location within the progress bar (121) corresponding to the beginning frame of the entry (145).

Figure 8:
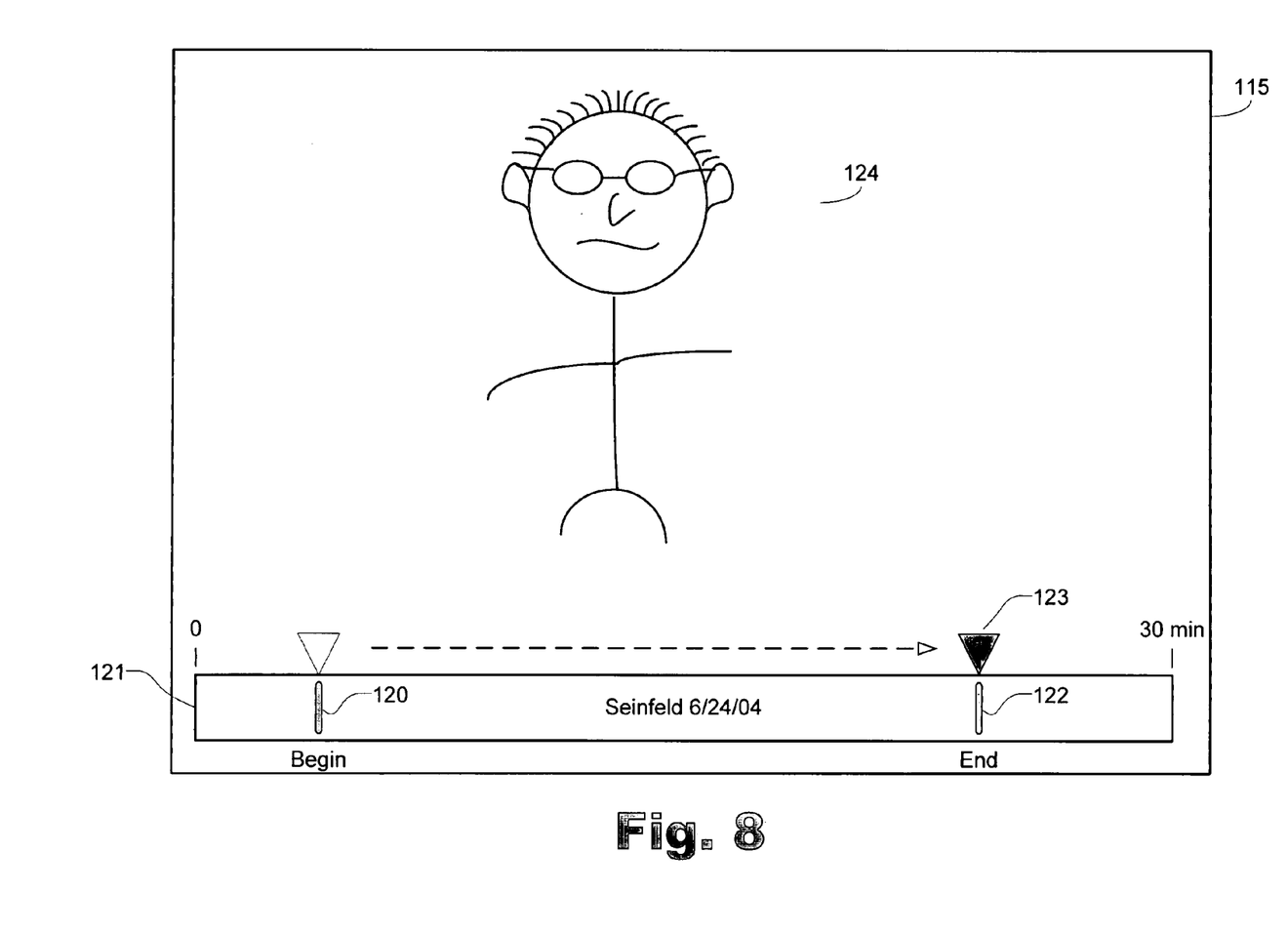
FIG. 8 shows that the user may move the progress indicator to a location within the progress bar corresponding to an end frame of a portion of the media content instance that is to be included as an entry of a play list according to one exemplary embodiment of the present invention.

Next, as shown in FIG. 8, the user may move the progress indicator (123) to a location within the progress bar (121) corresponding to an end frame of a portion of the media content instance (124) that is to be included as an entry (145; FIG. 4) of a play list. In one embodiment, the user may designate this frame as the end frame of the entry (145) by pressing the "bookmark" button (126; FIG. 2) on the user input device (116; FIG. 2). The frame may alternatively be designated as the end frame of the entry (145) by any other method as will be recognized by one of skill in the art. As shown in FIG. 8, a graphical bookmark (122) may be rendered on the display device (115) at a location within the progress bar (121) corresponding to the end frame of the entry (145).

The graphical bookmarks (120, 122) maybe vertical lines, as shown in FIG. 8. In an alternative embodiment, the graphical bookmarks (120, 122) may be any shape and may be located above, below, or on top of the progress bar (121). In general, the graphical bookmarks (120, 122) may be any symbol that allows the user to quickly identify the beginning and end frames of the portion of the media content instance (124) that is to be included in an entry (145; FIG. 4) of a play list.

Figure 9:
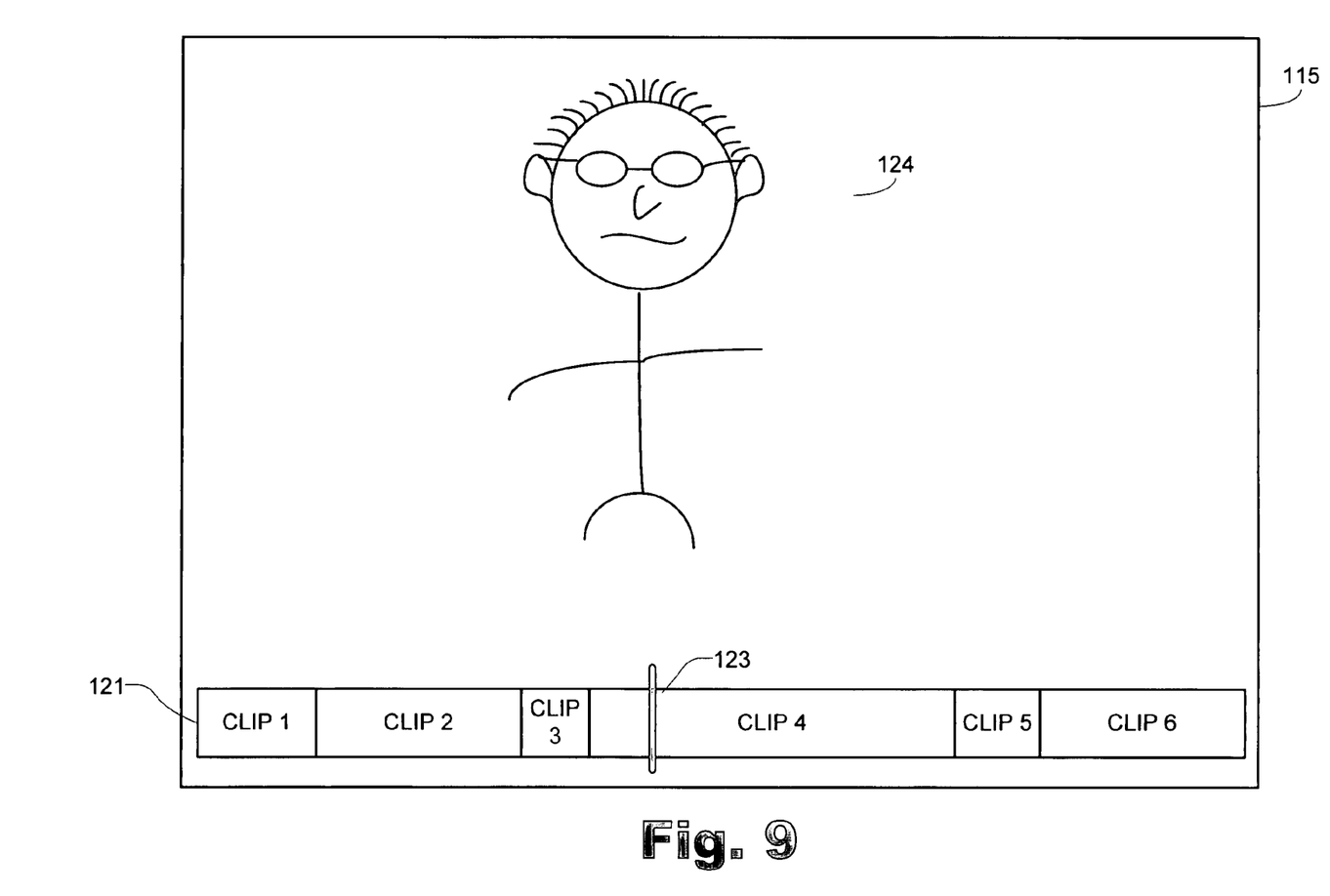
FIG. 9 illustrates an exemplary embodiment of the present invention wherein each of the entries in a play list are displayed on the display device.

Once the beginning and end frames have been designated by the user as illustrated in FIG. 8, the user may return to the GUI (141) of FIG. 4 and add to or edit additional entries (145) in the play list. After the user has finished building the play list, the user may cause the STB (100; FIG. 1) to display on the display device (115) the media content listed in the play list. FIG. 9 illustrates an exemplary embodiment of the present invention wherein each of the entries in a play list are displayed on the display device (115). As shown in FIG. 9, the progress bar (121) may graphically show the concatenated durations of all the entries (CLIP 1-CLIP 6) in the play list. It will be recognized that the display of the progress bar (121) is optional. Furthermore, the progress bar (121) may only illustrate the length of the media content included in the entry currently being displayed. In one embodiment, the user may view the portions of media content instances included in the entries of a play list in any trick play mode such as, slow motion, fast motion, reverse play or rewind, fast forward play, instant replay, jumping, pausing of live broadcast, and scanning.

Returning to FIG. 4, a media content instance may be flagged if it is associated with an entry (145). For example, a single bit may be included in the media content instance's corresponding media content file that that may be set to indicate that the media content instance is included in a particular entry (145). In one embodiment, a warning GUI (not shown) may be displayed if a user attempts to delete the media content instance at some future time. The warning GUI may be configured to display a message indicating to the user that the media content instance is part of a play list and that deleting the media content instance will affect one or more play lists.

Figure 10:
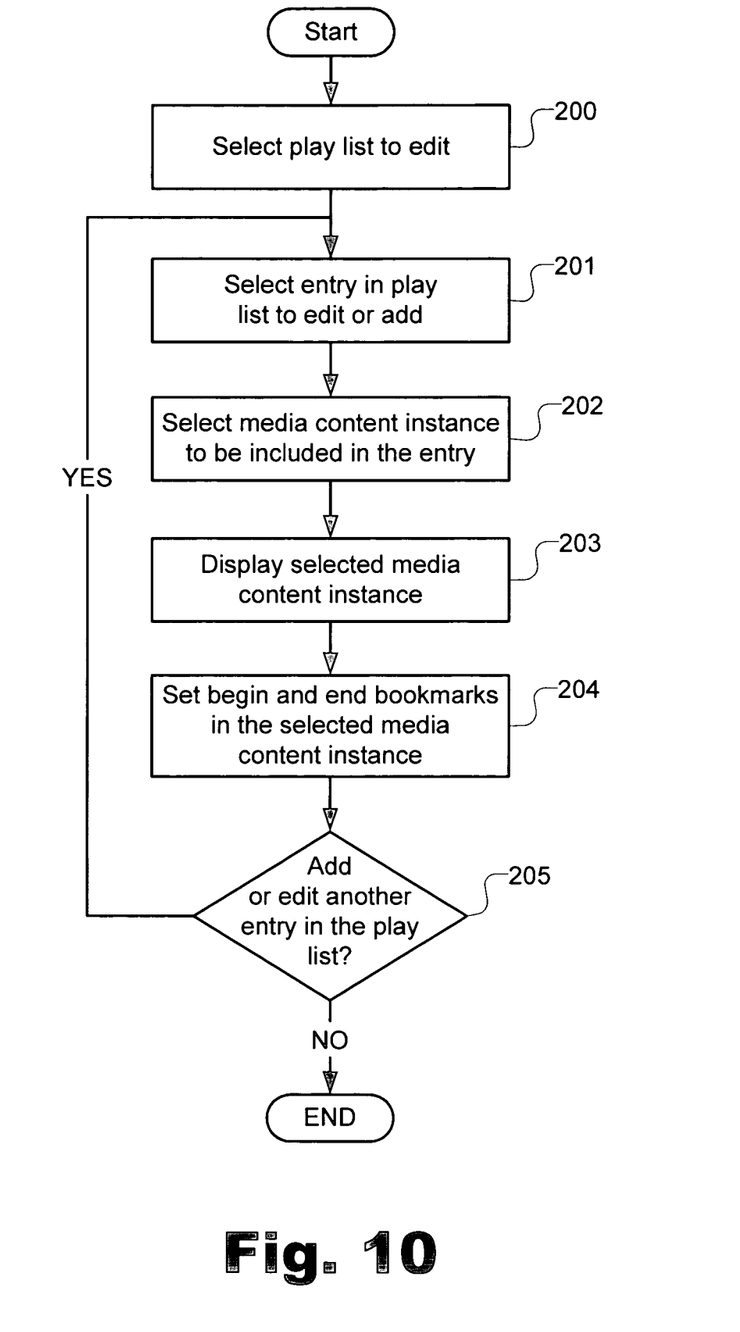
FIG. 10 is a flow chart illustrating an exemplary method of creating or editing a play list having a number of entries according to one exemplary embodiment of the present invention.

FIG. 10 is a flow chart illustrating an exemplary method of creating or editing a play list having a number of entries. Each of the entries includes a portion of a recorded media content instance. The play list may be selected by the user to be played by the STB (100; FIG. 1). In other words, the STB (100; FIG. 1) may display each of the portions of the recorded media content instances included in the entries of the play list. The display of these portions of recorded media content may be continuous.

As shown in FIG. 10, the method may begin by selecting a play list to edit (step 200). In one embodiment, the user may edit a pre-existing play list. Alternatively, the user may create a new play list. The user may then select an entry in the play list to edit or add (step 201). In other words, the user may edit a pre-existing entry or the user may create a new entry in the play list. In either case, the user may then select a media content instance of which a portion is to be included in the entry (step 202). The selected media content instance is then displayed on the display device (step 203). The user may then set begin and end bookmarks in the selected media content instance (step 204). These begin and end bookmarks correspond to the first and last frames of the portion of the media content instance that is to be included in the entry. The user may then repeat the process if another entry is to be edited or added (YES; step 205).

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of displaying recorded media content during a single viewing session with a set-top box, wherein recorded media content instances are stored in memory accessible to said set-top box, said method comprising:
   with a user interface of said set-top box, defining a number of entries such that each of said number of entries corresponds to at least a portion of one of said recorded media content instances;
   including each of said entries in a play list;
   selecting said play list for viewing; whereupon said set-top box sequentially outputs content according to said entries in said play list as said single viewing session; and
   displaying a progress bar, said progress bar graphically representing a total duration of said entries in said play list,
   wherein said step of defining said number of entries comprises:
      selecting one of said number of recorded media content instances accessible to said set-top box;
      displaying said selected media content instance; and
      designating a begin bookmark and an end bookmark in said selected media content instance;
      wherein said begin and end bookmarks correspond to beginning and ending frames of a portion of said selected media content instance to be included in one of said number of entries.

2. The method of claim 1, wherein said step of defining said number of entries comprises creating a new entry, said new entry referencing a portion of a said recorded media content instance, said recorded media content instance being a recording of previously broadcast content.

3. The method of claim 1, wherein said step of defining said number of entries comprises editing a pre-existing entry.

4. The method of claim 1, further comprising displaying a graphical user interface (GUI) configured to allow a user to add, delete, or edit any of said number of entries.

5. The method of claim 4, wherein said GUI shows a title corresponding to each of said number of entries.

6. A method of displaying recorded media content during a single viewing session with a set-top box, wherein recorded media content instances are stored in memory accessible to said set-top box, said method comprising:
   with a user interface of said set-top box, defining a number of entries such that each of said number of entries corresponds to at least a portion of one of said recorded media content instances;
   including each of said entries in a play list; and
   selecting said play list for viewing, whereupon said set-top box sequentially outputs content according to said entries in said play list as said single viewing session; and
   wherein said step of defining said number of entries comprises:
      selecting one of said number of recorded media content instances accessible to said set-top box;
      displaying said selected media content instance;
      designating a begin bookmark and an end bookmark in said selected media content instance, wherein said begin and end bookmarks correspond to beginning and ending frames of a portion of said selected media content instance to be included in one of said number of entries; and
   displaying a progress bar with said selected media content instance, said progress bar graphically representing the duration of said selected media content instance.

7. The method of claim 6, wherein said step of designating said begin and end bookmarks comprises:
   positioning a progress indicator at a position within said progress bar corresponding to said beginning and ending frames of said portion of said selected media content instance to be included in one of said number of entries; and
   sending a bookmark command from a user input device when said progress bar is positioned within said progress bar at said position corresponding to said beginning and ending frames.

8. The method of claim 7, wherein said step of sending a bookmark command from a user input device comprises pressing a button on said user input device.

9. The method of claim 1, wherein said step of selecting said one of said number of recorded media content instances comprises displaying a recorded program list GUI configured to allow a user to select said one of said number of recorded media content instances.

10. The method of claim 1, wherein said one of said entries comprises a number of pointers pointing to locations of said beginning and end frames within a media content file corresponding to said selected media content instance.

11. The method of claim 1, wherein said step of selecting said play list for viewing further comprises selecting said play list from among a number of play lists for viewing.

12. A method of displaying recorded media content during a single viewing session with a set-top box, wherein recorded media content instances are stored in memory accessible to said set-top box, said method comprising:
with a user interface of said set-top box, defining a number of entries such that each of said number of entries corresponds to at least a portion of one of said recorded media content instances;
including each of said entries in a play list;
selecting said play list for viewing; whereupon said set-top box sequentially outputs content according to said entries in said play list as said single viewing session;
displaying a progress bar, said progress bar graphically representing a total duration of said entries in said play list; and
flagging each of said media content instances corresponding to an entry included in said play list.

13. The method of claim 12, further comprising displaying a warning message indicating that a flagged media content instance is part of a playlist if a user attempts to delete one of said flagged media content instances.

14. A system for displaying a number of portions of a number of recorded media content instances during a single viewing session, said system comprising a set-top box (STB), wherein said STB is configured to:
define a number of entries such that each of said number of entries corresponds to one of said number of portions of said number of recorded media content instances;
include each of said entries in a play list; and
select said play list from a number of play lists for viewing; and
display on a display device said portions of said number of recorded media content instances included in said entries in said play list during said single viewing session;
wherein said STB is further configured to flag each of said number of media content instances included in said play list; and
wherein said STB is further configured to display a warning message indicating that a flagged media content instance is part of a playlist if a user attempts to delete one of said flagged media content instances.

15. The system of claim 14, wherein said STB is further configured to define said entries by creating a new entry.

16. The system of claim 14, wherein said STB is further configured to define said entries by editing a pre-existing entry.

17. The system of claim 14, wherein said STB is further configured to display a graphical user interface (GUI), said GUI being configured allow a user cause said STB to add, delete, or edit any of said number of entries.

18. The system of claim 17, wherein said GUI shows a title corresponding to each of said number of entries.

19. The system of claim 14, wherein said STB is further configured to:
select one of said number of recorded media content instances;
display said selected media content instance; and
designate a begin bookmark and an end bookmark in said selected media content instance;
wherein said begin and end bookmarks correspond to beginning and ending frames of a portion of said selected media content instance to be included in one of said number of entries.

20. The system of claim 19, wherein said STB is further configured to display a progress bar with said selected media content instance, said progress bar graphically representing the duration of said selected media content instance.

21. The system of claim 20, wherein said STB is further configured to:
position a progress indicator at a position within said progress bar corresponding to said beginning and ending frames of said portion of said selected media content instance to be included in one of said number of entries; and
receive a bookmark command from a user input device when said progress bar is positioned within said progress bar at said position corresponding to said beginning and ending frames.

22. The system of claim 21, wherein user input device is a remote control.

23. The system of claim 19, wherein said STB is further configured to display a recorded program list GUI configured to allow a user to select said one of said number of recorded media content instances.

24. The system of claim 19, wherein said one of said entries comprises a number of pointers pointing to locations of said beginning and end frames within a media content file corresponding to said selected media content instance.

25. The system of claim 14, wherein said STB is further configured to display a GUI configured to display a list of said number of play lists and allow a user to perform said selection.

26. The system of claim 14, wherein said STB is further configured to display a progress bar, said progress bar graphically representing a total duration of each of said portions of said number of recorded media content instances included in said entries in said play list.

27. A system of displaying a number of portions of a number of recorded media content instances during a single viewing session, said system comprising a set-top box configured for connection to a display device, said set-top box comprising:
means for defining a number of entries such that each of said number of entries corresponds to one of said number of portions of said number of recorded media content instances, said recorded media content instances being stored in electronic memory accessible to said set-top box;
means for including each of said entries in a play list;
means for selecting said play list from a number of play lists for viewing; means for sequentially outputting content to a display device according to said entries in said play list as said single viewing session; and
means for displaying a progress bar, said progress bar graphically representing a total duration of said portions of said number of recorded media content instances included in said entries in said play list and, within said progress bar, graphically representing a duration of each of said entries in said play list,
wherein said means for defining said number of entries comprises:

means for selecting one of said number of recorded media content instances;

means for displaying said selected media content instance; and means for designating a begin bookmark and an end bookmark in said selected media content instance;

wherein said begin and end bookmarks correspond to beginning and ending frames of a portion of said selected media content instance to be included in one of said number of entries.

28. The system of claim 27, further comprising means for displaying a graphical user interface (GUI) configured allow a user to add, delete, or edit any of said number of entries.

29. The system of claim 27, further comprising means for displaying a progress bar with said selected media content instance, said progress bar graphically representing the duration of said selected media content instance.

30. The system of claim 29, wherein said means for designating said begin and end bookmarks comprises:

means for positioning a progress indicator at a position within said progress bar corresponding to said beginning and ending frames of said portion of said selected media content instance to be included in one of said number of entries; and means for sending a bookmark command from a user input device when said progress bar is positioned within said progress bar at said position corresponding to said beginning and ending frames.

31. The system of claim 27, wherein said means for selecting said one of said number of recorded media content instances comprises means for displaying a recorded program list GUT configured to allow a user to select said one of said number of recorded media content instances.

32. The system of claim 27, wherein said means for selecting said play list from said number of play lists for viewing comprises means for displaying a GUT configured to display a list of said number of play lists and allow a user to perform said selection.

33. A system of displaying a number of portions of a number of recorded media content instances during a single viewing session, said system comprising a set-top box configured for connection to a display device, said set-top box comprising:

means for defining a number of entries such that each of said number of entries corresponds to one of said number of portions of said number of recorded media content instances, said recorded media content instances being stored in electronic memory accessible to said set-top box;

means for including each of said entries in a play list;

means for selecting said play list from a number of play lists for viewing; means for sequentially outputting content to a display device according to said entries in said play list as said single viewing session;

means for displaying a progress bar, said progress bar graphically representing a total duration of said portions of said number of recorded media content instances included in said entries in said play list and, within said progress bar, graphically representing a duration of each of said entries in said play list; and means for flagging each of said number of media content instances corresponding to an entry included in said play list.

34. The system of claim 33, further comprising means for displaying a warning message if a user attempts to delete one of said flagged media content instances.

35. The method of claim 1, further comprising, within said progress bar, a graphical representation of a duration of each of said entries in said play list.

* * * * *